Figure 1:
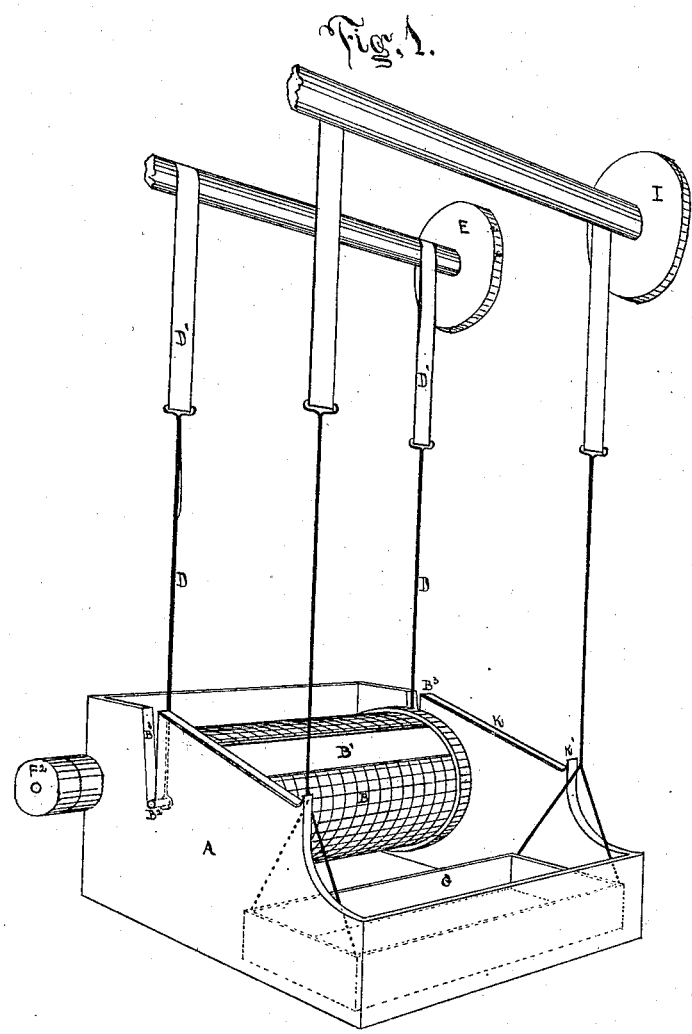

M. P. SMITH.
Improvement in Vegetable Parers.

No. 125,225.

2 Sheets--Sheet 1.

Patented April 2, 1872.

Witnesses
Jas. H. Kirkman
Wm. H. Woolford

Inventor
Marshall P. Smith

2 Sheets--Sheet 2.
M. P. SMITH.
Improvement in Vegetable Parers.
No. 125,225.   Patented April 2, 1872.
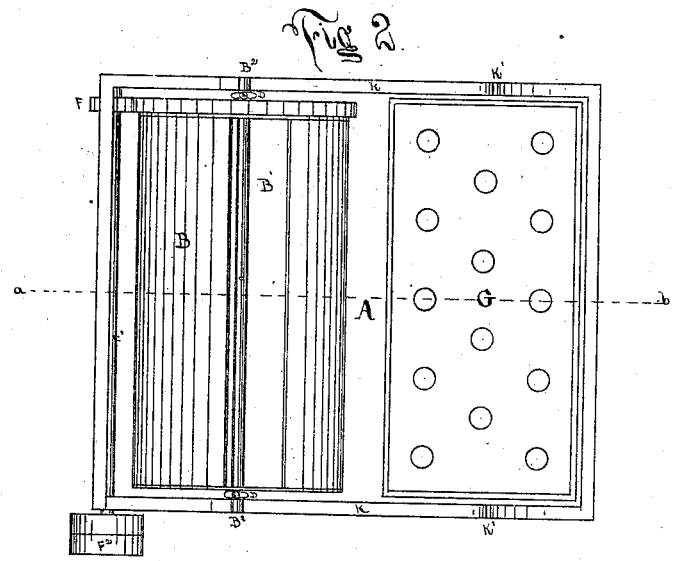
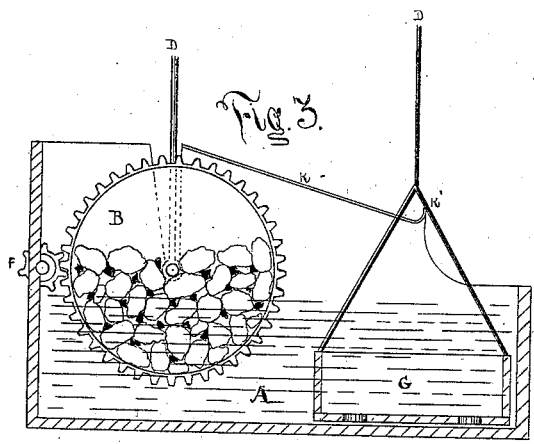
Witnesses
Jas. W. Kirkman
Wm. J. Woolford
Inventor
Marshall P. Smith

UNITED STATES PATENT OFFICE.

MARSHALL P. SMITH, OF BALTIMORE, MARYLAND.

IMPROVEMENT IN VEGETABLE PARERS.

Specification forming part of Letters Patent No. 125,225, dated April 2, 1872.

Specification describing certain Improvements in Machinery, and Process for Washing and Paring Vegetables or Fruits, invented by MARSHALL P. SMITH, of Baltimore, in the State of Maryland.

The object of my invention is to provide a rapid and economical method of removing the skins from vegetables or fruits with little or no waste of the edible portion thereof. To accomplish this result I make use of broken stones, brickbats, small pieces of cast-iron, or, in fact, any rough substance which, when mixed loosely with the vegetables in a cylinder or barrel, and revolved in water, will wash and rub off the skin.

I am aware that machines for washing vegetables by rolling them in cylinders, wholly or partially submerged in water, have long been in use; but their operation has only been to remove the dirt and earth adhering to them, and no effect was produced upon the skins unless the rolling was continued so long as to bruise and seriously injure the vegetable, or, indeed, until pieces of the edible substance were knocked of with the skin. I am also aware that paring-machines have been devised, consisting of a cylinder whose interior surface was of a rasping or grating character, and within which were vanes, attached to the cylinder or a central shaft, also having rasping surfaces.

Referring to the drawing, in which corresponding letters indicate corresponding parts, Figure 1 is a perspective view. Fig. 2 is a plan, and Fig. 3 is a vertical section on line $a\,b$ of the apparatus which I use in carrying out my invention.

A is a rectangular water-tight box, made of wood or metal. B is the barrel or cylinder which contains the vegetables and stones. This cylinder is closed at the ends, and on one side is a door, $B^1$, for the charging and discharging of the vegetables. Through the center passes a shaft, which rests in journals $B^2$ in the sides of the box A, at the bottom of the vertical slots $B^3$. These journals have no caps. One head of this cylinder is formed of a spur-wheel, the teeth of which project beyond the circumference of the cylinder, and these teeth engage with the pinion F on the shaft $F^1$, driven by the pulley $F^2$, by which means the cylinder is revolved. The sides of this cylinder are perforated to admit the water. D is an iron rod, the lower end of which encompasses the shaft at each end of the cylinder, and the upper end of which connects with a belt or chain, $D^1$, which passes around the barrel of the winch E in such a manner that when the winch is turned the cylinder will be lifted up from its bearings and deposited upon the inclined sides K of the box A resting upon its shaft. G is an open box or trough, suspended by chains or rods from another winch, I. The bottom is perforated to drain off the water when it is lifted. The sides and back of the box A are raised above the top of the cylinder to prevent the water being thrown on the floor when the cylinder is revolved; and the sides are inclined, as at K, to enable the cylinder to slide easily forward until arrested by the stop $K^1$. The front of the box A is cut away lower to give easier access to the trough G.

In operation, the box A is filled with water until about one-third of the cylinder is submerged. The cylinder B is then about two-thirds filled with vegetables and a quantity of broken stones thrown in. The door is then securely fastened and the cylinder started in rapid motion. The rough surfaces of the broken stone at once begin to grind off the skins of the vegetables, penetrating by their sharp corners into every crevice and eye, and removing all rotten and diseased portions, (because such are always softer than the healthy substance,) and in a few minutes completely paring the vegetable or fruit far more perfectly and economically than can possibly be effected by the knife or any grating instrument. As soon as the vegetables are pared the motion is stopped and the cylinder raised by the winch E until its shaft rests on the inclined planes K, when it slides forward to the stop $K^1$. The door is opened, the cylinder turned over, and its contents dumped into the trough G. The cylinder is again charged, returned by aid of the winch E to its original position, and again started in motion. While the second charge is being pared the attending workman raises the trough G by the winch I until the vegetables are exposed above the water, which will run out through the holes in the bottom; he then removes the vegetables into suitable receptacles and gathers the stones together, ready for use another time. The trough G is then lowered into the water again, ready to receive the second dumping of vegetables.

The drawing is made to a scale of one-half inch to one foot, and a machine of this size will pare one bushel of vegetables per minute. The dimensions can be varied to suit the quantity required.

Broken granite or hard-burned brickbats I have found to be most suitable for the purpose; but I do not limit myself to their use exclusively, as the same effect is produced by any kind of small stone, fragments of iron, and other equivalent substances of rough surface.

The winches E and I and the trough G are useful in economizing the labor of removing the vegetables from the cylinder, but are not essential to the operation of paring, and may be omitted and the cylinder emptied by hand or otherwise.

What I claim as new, and desire to secure by Letters Patent, is—

1. The box A and cylinder B when constructed substantially as described, and operated in combination with broken stones, pieces of iron, or their equivalents, substantially as herein set forth.

2. The process of paring vegetables and fruits by revolving them in a cylinder in combination with broken stones, pieces of iron, or their equivalents, substantially as shown and described.

3. The box A, cylinder B, trough G, and winches E and I, when constructed substantially in the manner and for the purposes set forth.

MARSHALL P. SMITH.

Witnesses:
JAS. W. KIRKMAN,
JAMES McEVOY.